(12) United States Patent
Sadanowicz et al.

(10) Patent No.: US 7,117,600 B1
(45) Date of Patent: Oct. 10, 2006

(54) PROCESS OF MANUFACTURING A CORNER ASSEMBLY

(75) Inventors: David Thomas Sadanowicz, Canton, MI (US); Don Paul Ward, Westland, MI (US); Larry William Brackmann, Brighton, MI (US); William A. Reimer, Jr., Clarksville, TN (US)

(73) Assignee: Robert Bosch GmbH, Stuttgart (DE)

( * ) Notice: Subject to any disclaimer, the term of this patent is extended or adjusted under 35 U.S.C. 154(b) by 531 days.

(21) Appl. No.: 10/703,722

(22) Filed: Nov. 7, 2003

(51) Int. Cl.
*B21D 53/10* (2006.01)
*B23P 21/00* (2006.01)

(52) U.S. Cl. .................... 29/898.07; 29/469

(58) Field of Classification Search .......... 29/898, 29/898.07, 898.06, 898.062, 469, 525, 464, 29/468, 428; 301/105.1
See application file for complete search history.

(56) References Cited

U.S. PATENT DOCUMENTS

| 5,842,388 | A | 12/1998 | Visser et al. |
| 6,212,981 | B1 | 4/2001 | Brinker et al. |
| 6,477,928 | B1 | 11/2002 | Newell et al. |
| 6,829,825 | B1 * | 12/2004 | Bowman et al. ......... 29/894.32 |

2006/0091719 A1 * 5/2006 Cowling et al. ............. 301/6.1

* cited by examiner

*Primary Examiner*—John C. Hong
(74) *Attorney, Agent, or Firm*—Leo H McCormick, Jr.; Sarah Taylor

(57) ABSTRACT

A process for manufacturing and assembling a corner assembly for a vehicle to achieve a perpendicular relationship between an axle of a vehicle and first and second braking surfaces on a rotor. In this process, after an inner race of a bearing is pressed onto a wheel hub and an outer race is pressed into a support structure to define a sub-assembly. The sub-assembly is placed onto a locating fixture such that the outer race supports the sub-assembly in a desired alignment where an out board surface on a radial flange is in a perpendicular relationship with the axis of the wheel hub. An arbor is inserted into an axle bore surrounding the axis of the wheel hub and the sub-assembly is rotated on the inner race to simulate operational condition of a vehicle as the surface of the out-board flange is finished machined to define a perpendicular relationship with the axis of the wheel hub. Once the out board surface is finish machined, the wheel hub is in a condition to receive a rotor by bringing an alignment surface on the rotor into engagement with the finished surface of the wheel hub. The rotor is retained on the hub through studs that extend from the wheel hub for attaching a wheel to the wheel rotor. The wheel hub is located such that radial braking surfaces on the rotor are in perpendicular planes with respect to the axis of the axle and parallel to the surfaces of the friction pads.

12 Claims, 2 Drawing Sheets

PROCESS OF MANUFACTURING A CORNER ASSEMBLY

This invention relates to a process of manufacturing a corner assembly for a vehicle wherein engagement of an alignment surface on a rotor with a radial flange on a wheel hub maintains the rotor in a relationship with the axis of the wheel hub.

BACKGROUND OF THE INVENTION

In currently manufactured vehicles, it is common to have disc brakes installed on all four corners of the vehicle with the wheels mounted on a hub attached to an axle. The wheel is mounted on a hub that is retained in a bearing that is fixed to a support member that in turn is secured to the suspension of the vehicle. A rotor located on the hub has a peripheral surface that is aligned between first and second friction members retained by a caliper member. A brake application is effected by moving first and second friction members into engagement with first and second braking surfaces adjacent to the peripheral surface of the rotor. In disc brake systems, it is important that the first and second friction members and the rotor are maintained in a parallel relationship, otherwise during a revolution of rotation of the rotor, the axial movement, commonly referred to as "lateral runout", between the first and second friction members can vary and adversely effect a smooth brake application. The effect of lateral runout is sensed by an operator as a surging action or movement on the brake pedal and/or vibrations in the vehicle.

Various processes have been suggested to define a perpendicular relationship between a brake rotor and the axis of rotation of the wheel hub such as the conjugate machining of a rotor and a wheel hub in U.S. Pat. No. 5,842,388; the finishing of a wheel hub that is attached to a knuckle assembly of a steering mechanism in U.S. Pat. No. 6,212,981; and finishing a rotor when installed on a vehicle in U.S. Pat. No. 6,477,928. The processes disclosed in U.S. Pat. Nos. 5,842,388 and 6,212,981 function in an adequate manner for original equipment that is installed in the manufacture of a new vehicle, unfortunately wear conditions may make it necessary to replace the rotor. Thereafter, when an original rotor is replaced with a new rotor it is possible that manufacturing tolerances may be cumulative and as a result in a stack up of tolerances the resulting "lateral runout" may be unacceptable in a mixture of new and old components in a disc brake. In addition, the process disclosed in U.S. Pat. No. 6,477,928 while functioning in an adequate manner may be too time consuming and costly for wide spread acceptance of by most owners of vehicle.

SUMMARY OF THE INVENTION

A primary object of the present invention is to provide a process of manufacturing a corner assembly for a vehicle to minimize lateral run out between first and second friction members and a rotor wherein an alignment surface on the rotor engages a surface on a radial flange of a wheel hub to establish a perpendicular relationship with the axis of the wheel hub.

According to this process, a wheel hub is obtained from a source, wherein the wheel hub has a cylindrical body having a first end and a second end with an axial bore that extends from the first end to the second end. The wheel hub is further defined by a peripheral surface with a radially extending flange that is located between the first end and the second end, a wheel pilot adjacent the first end, and a rotor pilot between the wheel pilot and an out-board side of the flange, a plurality of bolts that extend from an in-board side of the flange toward the out-board side of said flange, and a journal section that extends from the second end toward the radial flange. Thereafter, a bearing defined by an inner race and an outer race with a plurality of rollers located there between is obtained from a source and the inner race is pressed onto a journal section of the cylindrical body of the wheel hub to secure the bearing to the wheel hub. Then the outer race is pressed into an axial opening in a support structure until a lip on the outer race engages a first end of the support structure and a groove on the outer race adjacent the second end extends past a second end of the support structure. A ring is inserted into the groove in said outer race to maintain a fixed relationship between the groove and the second end of the support structure to define a sub-assembly of the corner assembly. This sub-assembly is located in an arbor such that the second end of the outer race and the out-board side of the radial flange on the wheel hub are located in a horizontal plane. A first vertical force is applied to the support member to hold and retain the radial flange on the wheel hub in the horizontal plane and the outer race in a stationary position with respect to the support member. A tool is inserted into the axial bore of the wheel hub and the wheel hub is rotated on the inner race to finish machine the out-board side of the radial flange and thereby define a perpendicular relationship between the out-board side of the flange and the axis of the wheel hub under operational conditions that may be experienced when installed on a vehicle. The sub-assembly is now ready for installation of a rotor by positioning an alignment surface on the rotor in contact with the finished out-board side of the flange such that the first and second opposing friction surfaces are in planes that are perpendicular to the axis of the wheel hub. A wheel is placed on the wheel hub and after nuts are screwed onto a plurality of bolts that extend from the wheel hub, the alignment surface on the rotor is held tight against the finished surface on the out-board surface on the radial flange to maintain the first and second opposing friction surfaces in the perpendicular relationship with the axis of the wheel hub to define a corner assembly.

An advantage of this invention resides in a process of manufacturing a wheel hub for a corner assembly wherein a surface on a radial flange is finish machined to define a perpendicular relationship with the axis of rotation of a bearing that is secured to the wheel hub and this finished surface is mated with an aligning surface on a rotor such that a desired lateral runout is achieved when the corner assembly is installed on a vehicle.

A further advantage of this invention resides in a process of machining and finishing a wheel hub wherein an outer race of a bearing is held stationary while the wheel hub is rotated about the axis of rotation of the bearing to define a perpendicular relationship between the axis of the wheel hub and an out-board surface on a flange to simulate operational conditions that may occur when installed on a vehicle.

DETAILED DESCRIPTION

Figure 1:
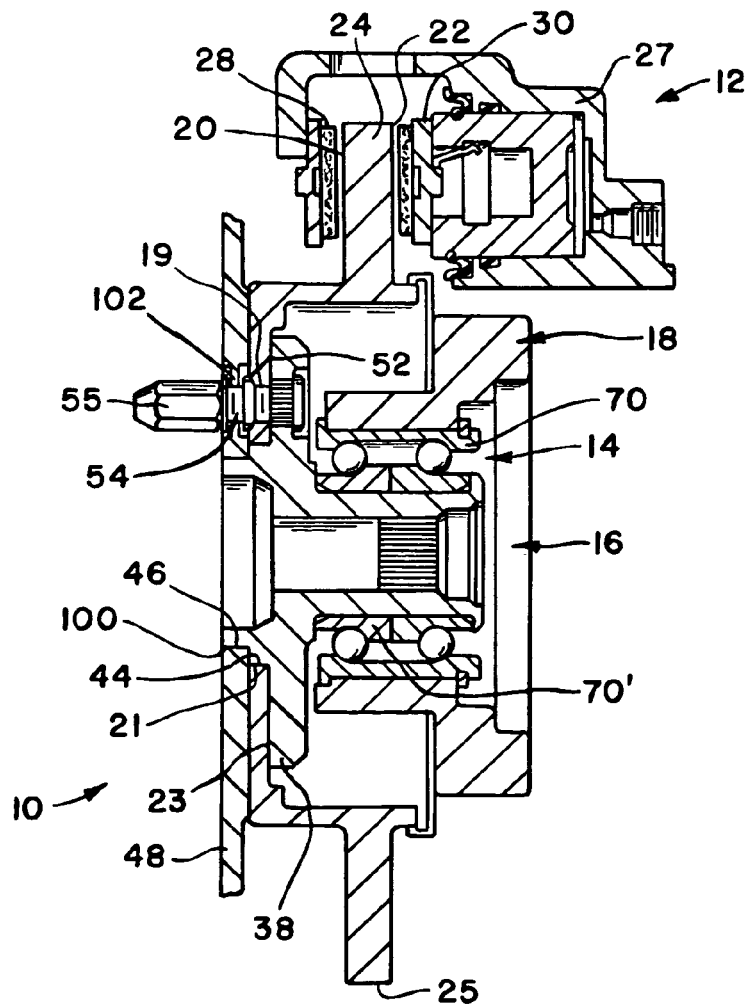
FIG. 1 is a sectional view of a corner assembly and disc brake for a vehicle having a wheel hub, bearing and support member made according to the present invention.

FIG. 1 illustrates a corner assembly 10 and a disc brake 12 for a vehicle made according to the present invention. The corner assembly 10 that includes a bearing 14 located between a wheel hub 16 and support structure 18 to align brake engagement surfaces 20 and 22 on a rotor 24 in parallel planes with respect to corresponding first 28 and second 30 friction members or pads retained in a caliper 27 of the disc brake 12.

Figure 2:
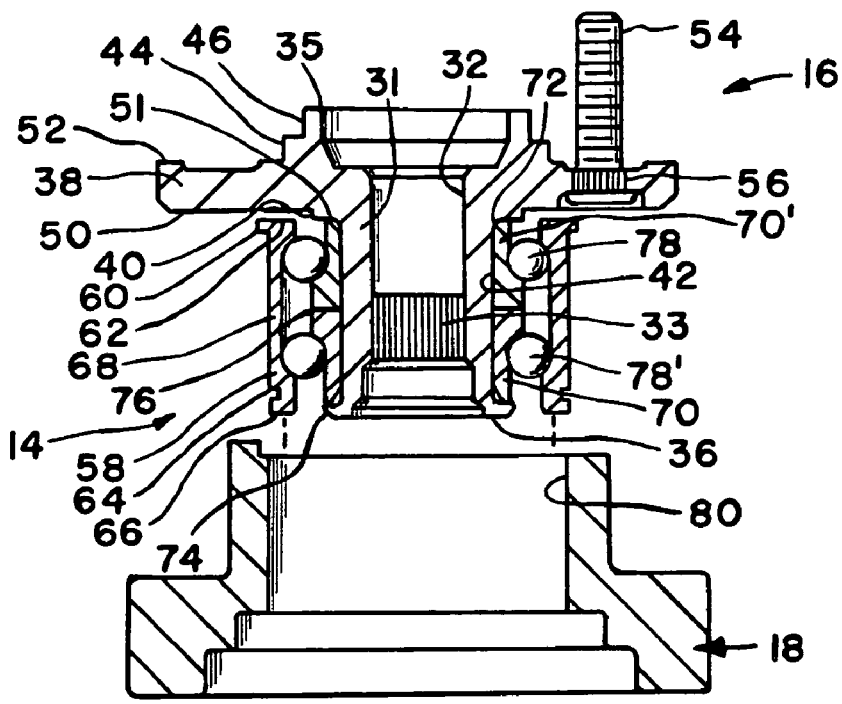
FIG. 2 is a sectional view showing a manufacturing relationship of the wheel hub, bearing and support member of FIG. 1.

The manufacture of the corner assembly 10 begins with a wheel hub 16 of a type illustrated in FIG. 2 that has been designed into a general desired configuration. The wheel hub 16 being defined by a cylindrical body 31 having a first end 35 and a second end 36 with an axial bore 32 that extends from the first end 35 to the second end 36, a portion 33 of which is splined. A mounting flange 38 that is located between the first end 35 and the second end 36 radially extends from peripheral surface 40 of the cylindrical body 31. The cylindrical body 31 also includes at least the following surfaces: a journal surface 42 located between the second end 36 and flange 38 that receives the bearing 14, a rotor pilot surface 44 that receives rotor 24, a wheel pilot surface 46 that receives a wheel rim 48, an inboard surface 50 on radial flange 38 and outboard surface 52 on radial flange 38. A plurality of mounting studs 54 (only one being shown) that are pressed into corresponding openings 56 that are located in a fixed distance arc around the axis of bore 32.

Once the wheel hub 16 has been obtained from a source a bearing 14 is pressed on to the journal surface 42. It is anticipated that either a ball or tapered bearing would work equally well but for simplicity in this application, a ball bearing 14 was selected.

Bearing 14 is defined by: an outer race 58 with a cylindrical body having a lip 60 on a first end 62, a peripheral groove 64 located adjacent to a second end 66 and an inner guide surface 68 that located between the first end 62 and the second end 66: a two piece inner race 70,70' that defines a cylindrical body having a first end 72 and a second end 74 with an inner guide surface 76 located there between; and a plurality of balls 78,78' are retained between guide surfaces 68 and 76. The length of the inner race 70,70' is less than the outer race 58 by an amount such that when the inner race 70,70' is pressed onto journal surface 42 of the wheel hub 16 to bring the first end 72 into engagement with shoulder 51 on the inboard side of flange 38 and end 36 of the wheel hub 16 is rolled into engagement with the second end 74, the bearing 14 is retained on the wheel hub 16. The retention of the bearing 14 on the wheel hub 16 could also occur through the use of a half shaft and nut.

Once the bearing 14 is attached to the wheel hub 16, a next step is the attachment to a support structure 18 by pressing the outer race 58 into an axial opening 80 in the support structure 18 until lip 60 engages a first side 82 of the support structure 18 and groove 64 extends past a second side 84 of the support structure 18. Thereafter, a ring 86 is located in groove 64 to maintain a fixed relationship between the groove 64 and the second side 84 such that the wheel hub 16 is attached to the support structure 18 to define a sub-assembly, as illustrated in FIG. 3.

Figure 4:
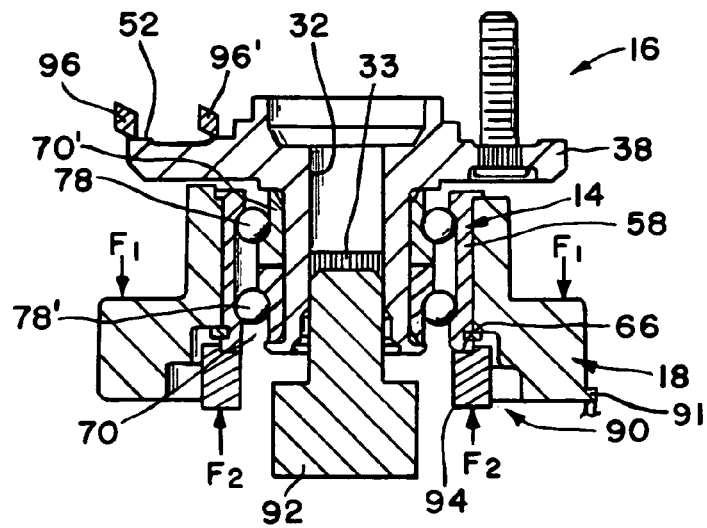
FIG. 4 is a sectional view of the sub-assembly of FIG. 3 being machined and finished in an arbor wherein the outer race of the bearing and support member are held stationary while the wheel hub is rotated about the axis of rotation of the bearing to define a perpendicular relationship between the axis of the wheel hub and an out-board surface on a flange of the wheel hub.
Figure 3:
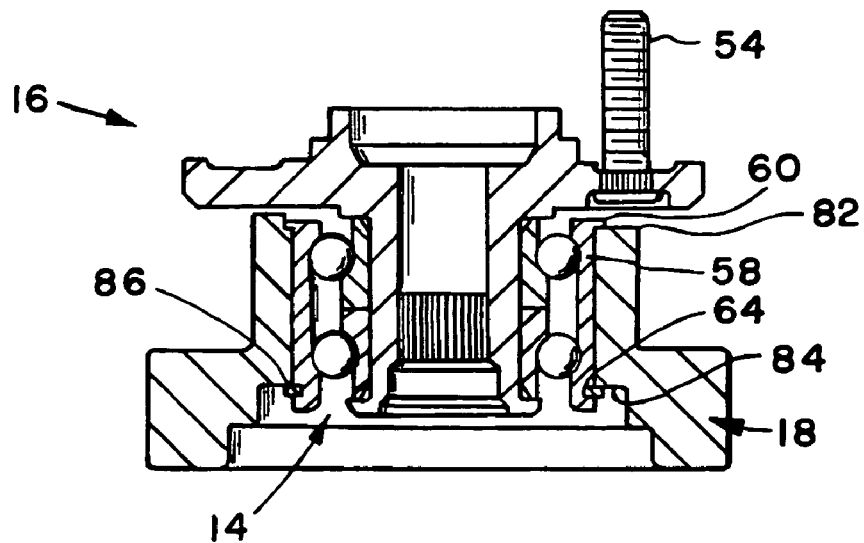
FIG. 3 is a sectional view of a fully assembled wheel hub, bearing and; support member of FIG. 2 to define a sub-assembly.

Up to this point the components in the sub-assembly have not been evaluated with respect to tolerance stack up and since it is important that brake engagement surfaces 20 and 22 on a rotor 24 that will be mated with the wheel hub 16 is positioned in parallel planes with respect to corresponding first 28 and second 30 friction pads of disc brake 12, the sub-assembly of FIG. 3 is placed on an arbor 90 as illustrated in FIG. 4.

The sub-assembly is located on a locating fixture 94 of a press member 90 such that the second end 62 of the outer race 58 of bearing 14 and the surface 52 on out-board side of radial flange 38 on the wheel hub 16 are located in a horizontal plane. A vertical force $F^1$ is applied to the support structure 18 is opposed by a reaction force $F^2$ that acts through the outer race 58 to hold the outer race 58 stationary while retaining the radial flange 38 on the wheel hub 16 in this horizontal plane. Thereafter, an arbor tool 92 is inserted into axial bore 32 and mated with splines 33 of the wheel hub 16 to rotate the wheel hub 16 on the inner race 70 while finish machining surface 52 on the out-board side of radial flange 38 to define a perpendicular relationship between surface 52 and the axis of axial bore 32 of the wheel hub 16. With the outer race 58 held stationary and the rotation of wheel hub 16 only occurring on the inner race 70 conditions similar to those that would be encountered during vehicle operation are more closely achieved than with some prior processes in establishing such a perpendicular relationship.

Under some circumstances it may be necessary to increase the vertical force $F^1$ to a greater level to sandwich the outer race 58 between support structure 18 and locating fixture 94 to hold and maintain the outboard surface 52 in the horizontal plane during the finish machining by cutter tools 96,96. However the intensity of the vertical force $F^1$ should be limited to a value that prevents rotation of the outer race 58 without effecting a tolerance relationship between the outer race 58, plurality of balls 78,78' and inner race 70,70' that could effect the rotational friction there between. Once surface 52 is finish machined to a perpendicular relationship with respect to axial bore 32, the wheel hub 16 is ready to receive a rotor 24. If the intensity of the vertical force $F^1$ reaches a predetermined level, it may be necessary to include a stop 91 that extends from the locating fixture 94 and engages the support structure 18 to assure that the rotation of the wheel hub 16 only occurs on the inner race 70,70'.

A rotor 24 is obtained from a source and defined by at least the following characteristics: an alignment surface 23 that is located adjacent an inner peripheral surface 21 and first 20 and second 22 opposing friction surfaces that are located adjacent an outer peripheral surface 25. The rotor 24 is placed on wheel hub 16 by placing the inner peripheral surface 21 on rotor pilot surface 44 of wheel hub 16 such that the plurality of bolts or studs 54 attached to the radial flange 38 extend through openings 19 (only one is shown) that surround the inner peripheral surface 21 of the rotor 24 to bring the alignment surface 23 into contact with the finished surface 52 on the outboard side of radial flange 38 and at the same time bringing the first 20 and second 22 opposing braking surfaces into perpendicular alignment with the axis defined by the axial bore 32 of the wheel hub 16. Once the rotor 24 has been located on wheel hub 16 and with the first 20 and second 22 opposing braking surfaces aligned with the corresponding first 28 and second 30 friction members or pads retained in a caliper 32, it may be necessary to install keepers on studs 54 if the wheels for a vehicle are not going to be attached at this time. We will assume that a wheel would be attached at this time to complete this assembly.

Once a wheel is obtained from a source, a center opening 100 on the wheel is located on wheel pilot surface 46 such that the plurality of bolts 54 extend through corresponding openings 102 in the wheel. Thereafter, nuts 55 are screwed onto the plurality of bolts 54 to bring the alignment surface 23 on rotor 24 into full engagement with surface 52 on the out-board side of radial flange 38 to maintain the first 20 and second 22 opposing friction surfaces in perpendicular alignment with the axis of axial bore 32 of wheel hub 16 and the axle of the vehicle to define a corner assembly 10 wherein the first 20 and second 22 opposing friction surfaces on rotor 24 are located in planes to minimize any lateral run out of the rotor 24 when in operation in a vehicle.

We claim:

1. A process for manufacturing and assembling a corner assembly for a vehicle, comprising the steps of:
    obtaining a wheel hub from a source, said wheel hub being defined by a cylindrical body having a first end and a second end with an axial bore that extends from the first end to the second end, a peripheral surface with a radially extending flange located between said first end and said second end, a wheel pilot located adjacent to said first end, and a rotor pilot located between said wheel pilot and an out-board side of said flange, said flange having means to accept a plurality of bolts, said bolts extending from an in-board side of said flange toward said out-board side of said flange, peripheral surface having a journal section that extends from said second end toward said radial flange;
    obtaining a bearing from a source, said bearing being defined by an inner race and an outer race with a plurality of rollers located between said inner race and said outer race, said outer race having a lip on said first end and an annular groove adjacent a second end;
    pressing said inner race onto said journal section of said cylindrical body to secure said bearing to said wheel hub;
    obtaining a support structure from a source, said support structure having an axial opening with a first end and a second end, pressing said outer race into said axial opening in said support structure
    securing said outer race to said support structure to define a sub-assembly;
    locating said sub-assembly in a locating fixture such that said second end of said outer race and said out-board side of said radial flange on said wheel hub are located in a horizontal plane;
    applying a vertical force to said support member to hold and retain said radial flange on said wheel hub in said horizontal plane;
    inserting an arbor into said axial bore of said wheel hub to rotate said wheel hub while finish machining said out-board side of said radial flange to define a perpendicular relationship between said out-board side of said flange of said hub and the axis of said wheel hub; and
    obtaining a rotor from a source, said rotor being defined by an alignment surface that is located adjacent to an inner peripheral surface and first and second opposing friction surfaces that are located adjacent to an outer peripheral surface, said inner peripheral surface being located on said rotor pilot surface of said wheel hub assembly such that said plurality of bolts attached to said radial flange extend through openings that surround said inner peripheral surface of said rotor to bring the alignment surface into contact with said finished out-board side of said radial flange to bring said first and second opposing friction surfaces into perpendicular alignment with said axis of said wheel hub.

2. The process as recited in claim 1 wherein said step of applying a vertical force to said second end of said outer race to prevent said outer race from rotating is sufficient to assure that the rotation of the wheel bearing only occurs between the rollers and inner race during the finish machining of said out-board side of said radial flange and more closely simulate operating condition of said corner assembly when installed on a vehicle.

3. The process as recited in claim 1 wherein said step of applying said vertical force is sufficient to prevent said rotation and yet limited to a value that would not effect a tolerance relationship between said outer race, plurality of balls and inner race that could adversely effect the rotational friction there between.

4. The process as recited in claim 3 wherein said step of applying said vertical force essentially sandwiches said sub-assembly between said support structure and said locating fixture.

5. The product produced by the process of claim 4.

6. The process as recited in claim 1 wherein said outer race is held stationary such that rotation of said wheel hub only occurs between said balls and inner race to closely simulate the operational condition of a vehicle.

7. The process as recited in claim 6 wherein said support structure engages a stop to assure that rotation only occurs with respect to said inner race.

8. A process for manufacturing and assembling a corner assembly for a vehicle, comprising the steps of:
    obtaining a wheel hub from a source, said wheel hub being defined by a cylindrical body having a first end and a second end with an axial bore that extends from the first end to the second end, a peripheral surface with a radially extending flange located between said first end and said second end, a wheel pilot adjacent to said first end, and a rotor pilot between said wheel pilot and an out-board side of said flange, said flange having a plurality of bolts that extend from an in-board side of said flange toward said out-board side of said flange, and peripheral surface having a journal section that extends from said second end toward said radial flange;
    obtaining a bearing from a source, said bearing being defined by an inner race and an outer race with a plurality of rollers located between said inner race and said outer race, said outer race having a lip on said first end and an annular groove adjacent a second end;
    pressing said inner race onto said journal section of said cylindrical body to secure said bearing to said wheel hub;
    obtaining a support structure from a source, said support structure having an axial opening with a first end and a second end,
    pressing said outer race into said axial opening in said support structure until said lip engages said first end and said groove and said second end of said outer race extend past said second end of said support structure;
    inserting a ring into said groove in said outer race to maintain said space relationship between said groove and said second end of said support structure to define a sub-assembly;

locating said sub-assembly in a locating fixture such that said second end of said outer race and said out-board side of said radial flange on said wheel hub are located in a horizontal plane;

applying a vertical force to said support member to hold and retain said radial flange on said wheel hub in said horizontal plane;

inserting an arbor into said axial bore of said wheel hub to rotate said wheel hub while finish machining said out-board side of said radial flange to define a perpendicular relationship between said out-board side and the axis of said wheel hub;

obtaining a rotor from a source, said rotor being defined by an alignment surface that is located adjacent an inner peripheral surface and first and second opposing friction surfaces that are located adjacent an outer peripheral surface, said inner peripheral surface being located on said rotor pilot surface of said wheel hub assembly such that said plurality of bolts attached to said radial flange extend through openings that surround said inner peripheral surface of said rotor to bring the alignment surface into contact with the finished out-board side of said radial flange to bring said first and second opposing friction surfaces into perpendicular alignment with said axis of said wheel hub;

obtaining a wheel from a source and locating a center opening of the wheel on said wheel pilot surface such that said plurality of bolts extend through corresponding openings in said wheel; and attaching nuts to said plurality of bolts to bring said alignment surface on said rotor into engagement with said out-board surface on said radial flange to maintain said first and second opposing friction surfaces in perpendicular alignment with the axis of said wheel hub to define said corner assembly.

9. The process as recited in claim 8 further including the step of applying a vertical force to said second end of said outer race prevents said outer race from rotating such that rotation of the wheel bearing occurs between said rollers and inner race during said finish machining of said out-board side of said radial flange to more closely simulate operating condition of said corner assembly when installed on a vehicle.

10. The process as recited in claim 9 wherein said step of applying said vertical force is sufficient to prevent said rotation of said outer race and yet limited to a value that does not effect a tolerance relationship between said outer race, plurality of balls and inner race that could adversely effect the rotational friction there between.

11. The process as recited in claim 10 wherein said step of applying said vertical force essentially sandwiches said sub-assembly between said support structure and said locating fixture.

12. The process as recited in claim 8 wherein said outer race is held stationary such that rotation of said wheel hub only occurs between said balls and inner race to closely simulate the operational condition of a vehicle.

* * * * *